(12) United States Patent
Wilson et al.

(10) Patent No.: US 8,315,128 B1
(45) Date of Patent: Nov. 20, 2012

(54) HEAT ASSISTED MAGNETIC RECORDING SYSTEM

(75) Inventors: Ross S. Wilson, Menlo Park, CA (US); Jason S. Goldberg, Saint Paul, MN (US)

(73) Assignee: LSI Corporation, Milpitas, CA (US)

( * ) Notice: Subject to any disclaimer, the term of this patent is extended or adjusted under 35 U.S.C. 154(b) by 0 days.

(21) Appl. No.: 13/346,102

(22) Filed: Jan. 9, 2012

(51) Int. Cl.
*G11B 11/00* (2006.01)
(52) U.S. Cl. .......... 369/13.02; 369/47.28; 369/59.19
(58) Field of Classification Search .......... 369/13.01, 369/13.02, 59.19, 53.34, 47.28, 44.34, 53.12, 369/44.41, 44.32, 47.53, 47.19, 124.02, 94
See application file for complete search history.

(56) References Cited

U.S. PATENT DOCUMENTS

7,242,651 B2 * 7/2007 Asano et al. .......... 369/47.28
* cited by examiner

*Primary Examiner* — Ali Neyzari
(74) *Attorney, Agent, or Firm* — Hamilton DeSanctis & Cha (57) ABSTRACT

Various embodiments of the present invention provide apparatuses, systems and methods for heat assisted magnetic recording. For example, an apparatus is disclosed that includes a signal generator operable to generate laser trigger pulses at the transition rate of the magnetic write data signal, a variable delay element operable to control an alignment between the laser pulse control signal and the magnetic write data signal, a phase difference detector operable to control the variable delay element, a triggerable pulse generator circuit operable to generate a laser pulse control signal based on the laser trigger pulses, a magnetic write head operable to record data to a magnetic storage medium under control of the magnetic write data signal, and a laser diode operable to heat the magnetic storage medium under control of the laser pulse control signal.

22 Claims, 8 Drawing Sheets

HEAT ASSISTED MAGNETIC RECORDING SYSTEM

BACKGROUND

Various magnetic storage systems such as hard disk drives utilize a write head to record data on a magnetic medium. Data to be recorded is provided to the write head as an alternating electrical current. The electrical current passes through a metallic coil in the write head, generating a magnetic field. The magnetization state of a pole tip in the write head is switched by the magnetic field. As the magnetized pole tip is passed over the magnetic medium, for example a spinning ferromagnetic platter, the magnetization of regions of the magnetic medium adjacent the pole tip is altered and can later be read back to retrieve the data.

High density magnetic recording implies small grain size with its increased susceptibility to decay of fine-grained recorded information under thermal agitation. Thus, as the grain size is reduced to increase recording density, stability of the recorded information is also reduced. Increasing the ferromagnetic anisotropy of the recording medium reduces susceptibility to thermally-induced decay, but requires write fields in excess of those attainable with conventional write heads. One solution to the writeability versus longevity dilemma for magnetic storage systems is Heat Assisted Magnetic Recording (HAMR), which heats the magnetic medium in the vicinity of a written data bit to near the Curie point using a laser, allowing the write head to switch the magnetic orientation on the medium to store the data bit. Thus, a medium with greater thermal stability may be used with the limited write head field strength by spot-heating the magnetic medium as data are recorded.

There exists a need in the art for improving the use of heat assisted magnetic recording in high density and high-bit-rate magnetic storage systems.

BRIEF SUMMARY

Various embodiments of the present invention provide apparatuses, systems and methods for heat assisted magnetic recording. For example, an apparatus is disclosed that includes a signal generator operable to generate laser trigger pulses at the transition rate of the magnetic write data signal, a variable delay element operable to control an alignment between the laser pulse control signal and the magnetic write data signal, a phase difference detector operable to control the variable delay element, a triggerable pulse generator circuit operable to generate a laser pulse control signal based on the laser trigger pulses, a magnetic write head operable to record data to a magnetic storage medium under control of the magnetic write data signal, and a laser diode operable to heat the magnetic storage medium under control of the laser pulse control signal. In some instances of the aforementioned embodiments, the signal generator is located in a write channel circuit and the triggerable pulse generator circuit is located in a preamplifier, with the laser trigger pulses transmitted between the write channel circuit and the preamplifier across a flexible transmission line. In some cases, the triggerable pulse generator circuit is operable to programmatically adjust the pulse width of the laser pulse control signal.

Some embodiments include a laser precompensation circuit operable to apply a precompensation shift to the laser pulse control signal, and a magnetic precompensation circuit operable to apply a precompensation shift to the magnetic write data signal. In some instances of the aforementioned embodiments, the variable delay element adjusts the relative phasing between the laser trigger pulses and the magnetic write data; such phasing may possess a span greater than the bit period of the magnetic write data signal.

Other embodiments of the present invention provide methods for heat assisted magnetic recording. Some of these include generating laser trigger pulses in a write channel, transmitting the laser trigger pulses to a preamplifier, generating a laser pulse control signal based on the laser trigger pulses, adjusting a time alignment of the laser pulse control signal with a magnetic write data signal, and controlling a laser diode with the laser pulse control signal to heat a magnetic storage medium while writing the magnetic write data signal to the magnetic storage medium. Some instances also include calculating a laser pulse precompensation for the laser pulse control signal, applying a bulk delay to the magnetic write data signal, and calculating a magnetic write precompensation for the magnetic write data signal. Adjusting the time alignment maintains the correlation between a pulse in the laser pulse control signal and a corresponding data bit in the magnetic write data signal.

Yet other embodiments of the present invention provide a storage system including a storage medium maintaining a data set, a write channel circuit, a preamplifier circuit, a magnetic write head operable to record data to a magnetic storage medium under control of a magnetic write data signal representative of the data set, and a laser diode operable to heat the magnetic storage medium under control of a laser pulse control signal. The write channel circuit includes a signal generator operable to generate the laser trigger pulse signal at the transition rate of the magnetic write data signal, and a variable delay element operable to control an alignment between the laser trigger pulse signal and the magnetic write data signal. The preamplifier circuit includes a phase difference detector operable to control the variable delay element, and a triggerable pulse generator circuit operable to generate a laser pulse control signal based on the laser trigger pulse signal. In some instances, the write channel circuit also includes a magnetic precompensation circuit operable to apply a precompensation shift to the magnetic write data signal, and a laser pulse precompensation circuit operable to apply a precompensation shift to the laser pulse control signal. The variable delay element is operable to compensate for a phase difference between the laser pulse control signal and the magnetic write data signal across a range that is greater than a bit period of the magnetic write data signal.

This summary provides only a general outline of some embodiments according to the present invention. Many other objects, features, advantages and other embodiments of the present invention will become more fully apparent from the following detailed description, the appended claims and the accompanying drawings.

BRIEF DESCRIPTION OF THE DRAWINGS

A further understanding of the various embodiments of the present invention may be realized by reference to the figures which are described in remaining portions of the specification. In the figures, like reference numerals may be used throughout several drawings to refer to similar components. In the figures, like reference numerals are used throughout several figures to refer to similar components. In some instances, a sub-label consisting of a lower case letter is associated with a reference numeral to denote one of multiple similar components. When reference is made to a reference numeral without specification to an existing sub-label, it is intended to refer to all such multiple similar components.

DETAILED DESCRIPTION OF THE INVENTION

Various embodiments of the present invention provide apparatuses, systems and methods for heat assisted magnetic recording, including a HAMR laser pulse generator. In some embodiments, laser precompensation is applied in conjunction with and aligned to magnetic precompensation.

The pulsed-write HAMR system disclosed herein pulses a laser diode to heat the magnetic recording medium as data is written to it by the write head. By pulsing the laser diode, the temperature of the slider on which the write head is mounted is reduced relative to the temperature it would assume were the laser continually illuminated, in turn reducing the influence of the laser diode on pole tip protrusion. Recording density may also benefit from laser pulsing, if optical and magnetic gradients are aligned.

Laser trigger pulses are generated in a write channel circuit and transmitted to a preamplifier over a flexible transmission line for use in driving a laser diode in a write head. In some embodiments, the laser trigger pulses generated at the same bit (transition) rate as are the write data, in order to reduce the signaling frequency on the flex-circuit. For pulsed recording the laser illumination undergoes a complete on/off cycle in each data bit cell, thus the laser trigger pulses are generated in the write channel circuit and used to generate a laser pulse control signal in the preamplifier that has a frequency twice that of the data signal. In some embodiments, the laser pulse control signal also enables time precompensation of the laser diode heating. In some instances of these embodiments, the precompensated laser pulse control signals is correlated with a magnetic precompensated data signal.

Figure 1:
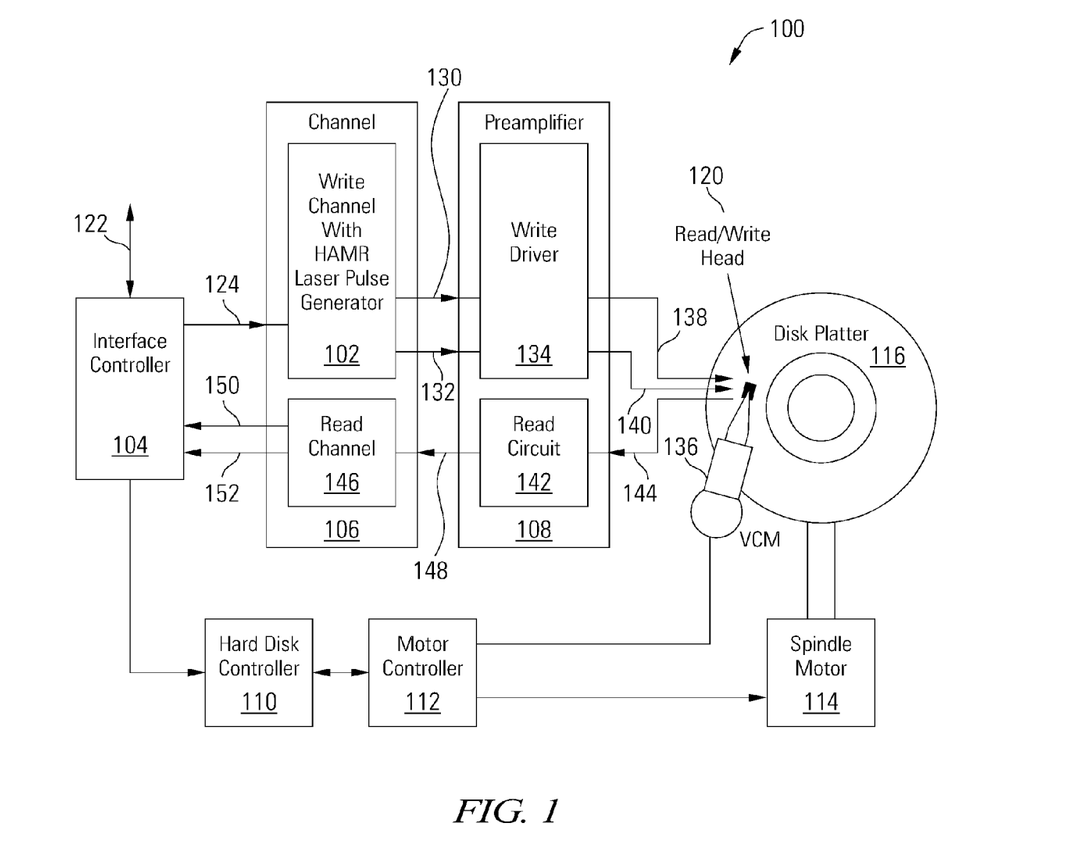
FIG. 1 depicts a magnetic storage system including a write channel having a triggerable HAMR laser pulse generator in accordance with some embodiments of the present invention.

Turning to FIG. 1, a magnetic storage system 100 is depicted including a write channel 102 that generates triggerable HAMR laser pulse generator in accordance with some embodiments of the present invention. Storage system 100 may be, for example, a hard disk drive. Storage system 100 includes an interface controller 104, channel circuit 106, preamplifier 108, a hard disk controller 110, a motor controller 112, a spindle motor 114, a disk platter 116, and a read/write head assembly 120. Interface controller 104 controls addressing and timing of data to/from disk platter 116. The interface controller 104 may include devices such as a processor, buffer memory, format control, error correction circuits, and interface circuits. The data on disk platter 116 consists of groups of magnetic signals that may be written and detected by read/write head assembly 120 when the assembly is properly positioned over disk platter 116. In one embodiment, disk platter 116 includes magnetic signals recorded in accordance with either a longitudinal or a perpendicular recording scheme.

During a write operation, interface controller 104 receives digital data 122 to be stored on the disk platter 116 and provides corresponding digital write data 124 to the write channel 102 in the channel circuit 106. The digital data 122 may be received in serial form on a standardized device interface such as a Serial Advanced Technology Attachment (SATA) interface. During write operations, the digital data 122 is stored in a local buffer memory, formatted and augmented with error correction codes.

Write channel 102 may process the digital write data 124 in a number of ways, such as serializing the data, modulation coding the data and adding parity bits, serializing the data at the desired bit-rate, and performing magnetic write precompensation. The write channel 102 also generates laser trigger pulses. The write channel 102 provides encoded write data 130 and the laser trigger pulse signal 132 to a write driver 134 in preamplifier 108. In some embodiments, the preamplifier 108 is mounted on an actuator arm 136, and the encoded write data 130 and laser trigger pulse signal 132 are driven from the channel circuit 106 by transmitters and delivered over a flex-cable in differential positive emitter-coupled logic (PECL) format to the write and laser driver 133 in the arm-mounted preamplifier 108. The preamplifier 108 converts the encoded write data 130 to an analog signal, generates a laser pulse control signal based on the laser trigger pulse signal 132, and impresses in the read/write head assembly 120 a bipolar programmable write current 138 of polarity determined by that of the PECL input 132. Simultaneously, PECL laser trigger pulse signal input 132 causes generation of a laser pulse control signal which is impressed in read/write head assembly 120 on line 140.

In a typical read operation, read/write head assembly 120 is accurately positioned by motor controller 112 over a desired data track on disk platter 116. Motor controller 112 both positions read/write head assembly 120 in relation to disk platter 116 and drives spindle motor 114 by moving read/write head assembly 120 to the proper data track on disk platter 116 under the direction of hard disk controller 110. Spindle motor 114 spins disk platter 116 at a determined spin rate (RPMs). A read circuit 142 in the preamplifier 108 establishes a bias current in the magneto-resistive read/write head assembly 120. Once read/write head assembly 120 is positioned adjacent the proper data track, magnetic signals representing data on disk platter 116 are sensed by read/write head assembly 120 as disk platter 116 is rotated by spindle motor 114. The sensed magnetic signals are provided as a continuous, minute analog signal 144 representative of the magnetic data on disk platter 116. This minute analog signal 142 is transferred from read/write head assembly 120 to read circuit 142 in the preamplifier 106, where it is amplified and is conveyed to a read channel 146 in the channel circuit 106 as analog read data 148. In turn, read channel 146 decodes and digitizes the received analog signal to recreate the user data originally written to disk platter 116, as well as extracting servo information.

As part of processing the analog read data 148, read channel circuit 146 may perform one or more operations such as analog filtering, variable gain amplification, analog to digital conversion, equalization, timing recovery, data detection, decoding, deserialization, and servo demodulation to obtain the user data and servo information. The user data is provided by read channel 146 as digital read data 150 to the interface controller 104, where it is error-corrected, stripped of special formatting fields, and reassembled in buffer memory for transmission to a user device as digital data 122. The read channel 146 also provides the servo data 152 to the interface controller 104 for use in driving the hard disk controller 110 and motor controller 112. During both the read and write operations, microcode in the interface controller 104 controls spindle speed and regulates head position to maintain accurate track-following and to seek between tracks. Servo position information for these functions is demodulated by the read channel 146 from dedicated fields prerecorded on the disk platter 116 at intervals between data records.

It should be noted that storage system 100 may be integrated into a larger storage system such as, for example, a RAID (redundant array of inexpensive disks or redundant array of independent disks) based storage system.

It should also be noted that various functions or blocks of storage system 100 may be implemented in either software or firmware, while other functions or blocks are implemented in hardware. The various blocks disclosed herein may be implemented in integrated circuits along with other functionality. Such integrated circuits may include all of the functions of a given block, system or circuit, or only a subset of the block, system or circuit. Further, elements of the blocks, systems or circuits may be implemented across multiple integrated circuits. Such integrated circuits may be any type of integrated circuit known in the art including, but are not limited to, a monolithic integrated circuit, a flip chip integrated circuit, a multichip module integrated circuit, and/or a mixed signal integrated circuit. It should also be noted that various functions of the blocks, systems or circuits discussed herein may be implemented in either software or firmware. In some such cases, the entire system, block or circuit may be implemented using its software or firmware equivalent. In other cases, the one part of a given system, block or circuit may be implemented in software or firmware, while other parts are implemented in hardware.

Figure 2:
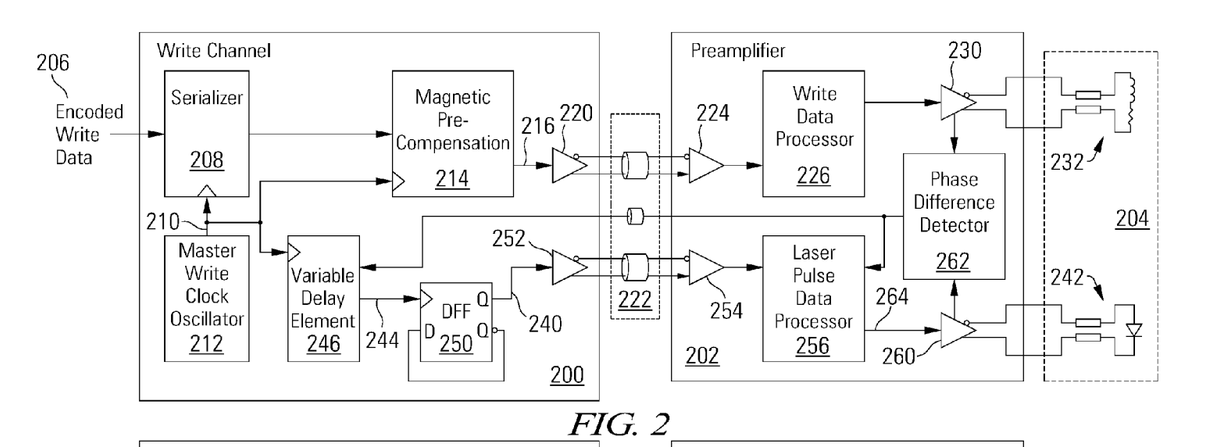
FIG. 2 depicts an implementation of a write channel, preamplifier and magnetic write head suitable for use in the magnetic storage system of FIG. 1 and incorporating magnetic write-precompensation in accordance with some embodiments of the present invention.

Turning to FIG. 2, an implementation of a write channel 200, preamplifier 202 and write head assembly 204 is depicted suitable for use in the magnetic storage system of FIG. 1 in accordance with some embodiments of the present invention. Encoded write data 206 is provided to the write channel 200, where it is run-length-encoded, serialized in a serializer 208 and synchronized to a clock signal 210 from a master write clock oscillator 212. The master write clock oscillator 212 may be any circuit or device for generating a clock signal 210, such as a multiphase ring oscillator forming part of a frequency synthesizer locked to a reference crystal source, or to servo information prerecorded on the disk platter. The serializer 208 converts a parallel data input to a serial data stream. The serializer 208 may be, but is not limited to, a time-division data multiplexer, which multiplexes the parallel data input to a single output, controlled by a multi-phase clock circuit which generates multiple select clock signals, distributed equally in phase over 360 degrees, and which may be derived from the clock signal 210. The multiple select clock signals are used to select individual bits of the parallel data input in a particular order. Based on the disclosure herein, one of ordinary skill in the art will recognize a variety of circuits that may be used to serialize the encoded write data 206, for example a shift register.

The encoded write data 206 is prepared in the write channel 200 to be written by the write head assembly 204 to the magnetic storage medium. Writing information to a magnetic storage medium includes generating a magnetic field in close proximity to the storage medium to be written. One problem that may arise when writing to a magnetic storage medium is that the magnetic field generated by a preceding bit pattern may interfere or otherwise affect a magnetic field generated during a write of a succeeding bit pattern. In particular, a magnetic field generated to write a current bit pattern may exhibit a non-linear transition shift (NLTS) caused by magnetic interactions between write-field and already written transitions in high density magnetic recording. NLTS leads to data-dependent nonlinear distortions in the read back signal, causing degradation in data-recovery performance, and is countered by use of a magnetic precompensation circuit 214 in the write data path. The magnetic precompensation circuit 214 applies pattern-dependent delays to the write data as it is impressed in the magnetic write head to compensate for NLTS such that each bit of the write data is written to a desired location on the storage medium.

It should be noted that while various components of the write channel 200 and preamplifier 202 are described as "circuits" that they may be implemented either as an electronic circuit or as a software/firmware circuit. Such software/firmware circuits include a processor associated with a memory device that includes instructions executable by the processor to perform the particular functions described herein. Such processors may be general purpose processors or processors specifically tailored to perform a given function depending upon the particular implementation requirements. In some cases, the processor may be designed to perform functions related to more than one particular module. Based on the disclosure provided herein, one of ordinary skill in the art will recognize a variety of combinations of dedicated electronic circuitry and software/firmware that may be used in accordance with different embodiments of the present invention.

The magnetic write data 216, which in some embodiments is write-precompensated, is provided to a driver 220, which transmits the magnetic write data 216 in differential or other form across a multi-conductor actuator arm flexible transmission line 222 to the arm-mounted preamplifier 202. A receiver 224 receives the transmitted magnetic write data and provides it to a write data processor 226 and write driver 230, which convert the magnetic write data to an analog signal and drive the magnetic write head 232 to record the data to a disk platter. The write data processor 226 and write driver 230 may perform a variety of functions in different embodiments of a magnetic storage system, and those of ordinary skill in the art will recognize a number of circuits that may be used to perform these functions.

In order to support high-density recording of data on the medium, in accordance with the principles of HAMR, a laser pulse control signal 240 is generated in the write channel 200 to drive a laser diode 242 in the write head assembly 204 as data bits are written by the magnetic write head 232. The laser diode 242 is pulsed in conjunction with the data bits written by the magnetic write head 232, reducing power consumption and heating in the flexible transmission line 222 and/or write head assembly 404 and aiding in areal density increase. The pulses in the laser diode 242 may be correlated with the data bits as they are written by the magnetic write head 232 in a variety of techniques to meet the system requirements and improve the readability and stability of the recorded data. A shifted clock signal 244 is provided by a variable delay element 246, which is implemented in some embodiments as a programmable phase interpolator or edge selector switch, enabling the establishment of phasing of the laser pulse-data relative to the magnetic data. The variable delay element 246 in these embodiments mixes and/or selects appropriate phases of multiphase ring oscillator in master write clock oscillator 212 to produce a shifted clock signal 244 of frequency equaling that of magnetic write clock signal 210, but with programmable phase relationship thereto. Other delay methods may also be used.

A laser trigger pulse signal 240 is generated at the transition rate of the magnetic write data 216 by a signal generator based on shifted clock signal 244, thereby reducing heating and bandwidth requirements in the flexible transmission line 222 due to the laser trigger pulse signal 240. In some embodiments, the signal generator comprises a D flip flop 250. As one laser pulse per bit requires a full on/off cycle to occur in each run length coded bit cell in the magnetic write data 216, the laser pulse control signal 264 has a frequency twice that of the magnetic write data 216. The flip flop 250 transforms the shifted clock signal 244 from a form having one electrical cycle per written bit to one having one edge per bit, minimizing bandwidth requirements in the flexible transmission line 222. The result is driven out differentially onto the flexible transmission line 222 by a driver 252 for reception by a receiver 254 in the preamplifier 202. Based on the disclosure herein, one of ordinary skill in the art will recognize a variety of circuits that may be used to generate laser trigger pulse signal 240 based on shifted clock signal 244.

In other embodiments, to minimize the number of conductors in the flexible transmission line 222, the laser trigger pulse signal 240 is transmitted by the driver 252 to the preamplifier 202 by multiplexing the data onto lines not used during a write operation, for example using read data transmission lines (e.g., 148, FIG. 1). In multiplexing, line 148 of FIG. 1 during read operations conveys read data from preamplifier 108 to read Channel 146. Conversely, during write operations, line 148 conveys laser trigger pulses from write channel 102 to write and laser driver 134.

A receiver 254 in the preamplifier 202 receives the laser trigger pulse signal 240 and delivers it to a laser pulse data processor 256, the output of which controls the laser diode 242 through laser driver 260. The laser pulse data processor 256 includes a triggerable pulse generator that generates a data rate laser pulse control signal 264 based on laser trigger pulses from the write channel 200. The triggerable pulse generator is activated by each edge, both positive- and negative-going, of the laser trigger pulses. The laser pulse data processor 256 may also control the pulse width of the laser pulse control signal 264. The laser driver 260 amplifies the low-level laser pulse control signal 264 to a programmable amplitude sufficient to drive the laser diode 242 between threshold and pulse-on states over an extinction to full-on range.

To assure that the output of the laser driver 260 is properly time-aligned to the output of the write driver 230, a phase difference detector 262 may be provided in the preamplifier 202 to measure phase difference and control the variable delay element 246 in the write channel 200. In some embodiments, the phase difference detector 262 controls the laser pulse data processor 256. The phase difference detector 262 may be, but is not limited to, a local phase detector or part of a loopback circuit.

Figure 3A:
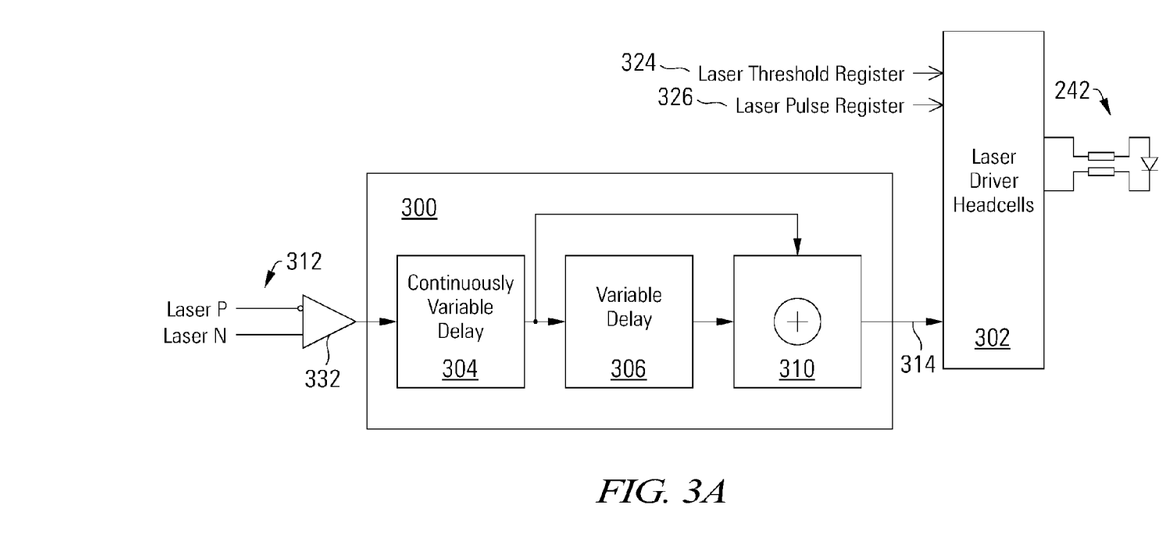
FIG. 3A depicts an implementation of a laser pulse data processor and laser driver suitable for use in the write channel of FIG. 2 in accordance with some embodiments of the present invention.

Turning to FIG. 3A, an implementation is depicted of a laser pulse data processor 300 and laser driver 302 suitable for use in place of the laser pulse data processor 256 and the laser driver 260, respectively, of FIG. 2 in accordance with some embodiments of the present invention. A continuously variable delay element 304 is included in some instances to augment a delay action provided by variable delay element 246 or 446. If continuously variable delay element 304 is included in laser pulse data processor 300, the variable delay element 246 or 446 may be a digital phase selector, with continuously variable delay element 304 serving as a vernier between coarse phase steps.

Figure 3B:
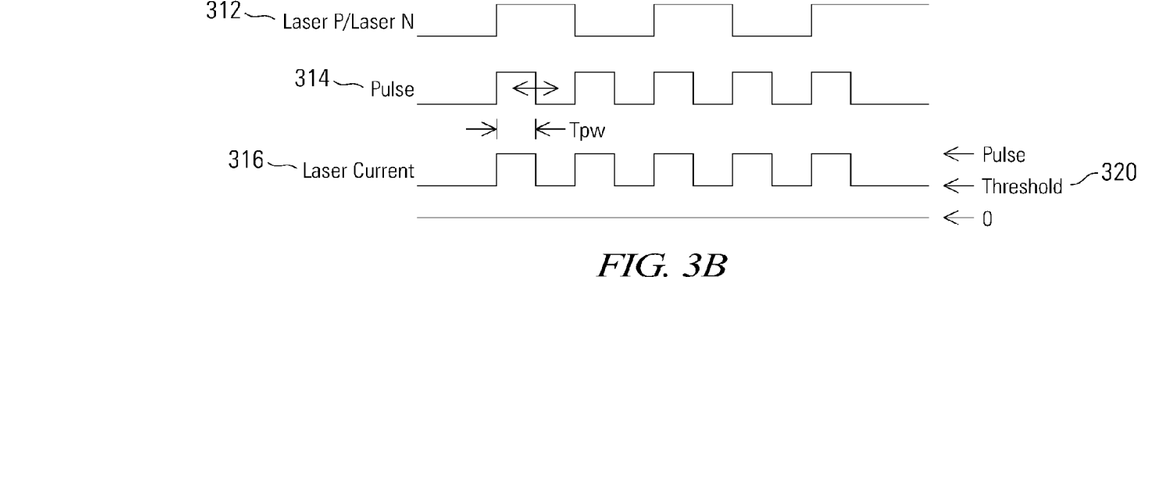
FIG. 3B depicts a timing diagram of various signals in the laser pulse data processor of FIG. 3A in accordance with some embodiments of the present invention.

A variable delay element 306 and XOR gate 310 operate together to generate a data rate laser pulse control signal 314. The duration of the variable delay element 306 establishes the pulse width $T_{PW}$ of the 'on' interval of the laser pulse control signal 314 and thus of the current 316 through laser diode 242, as illustrated in the waveform diagram of FIG. 3B. For flexibility, $T_{PW}$ may vary within a range such as $\sim 0 \leq T_{PW} \leq T_{BIT}$, where $T_{BIT}$ is the bit-time of the system. The 'on' pulse rises from a laser threshold baseline level 320 to a pulse level 322 selected to turn on the laser diode 242. The amplitudes of the laser threshold baseline level 320 and the pulse level 322 may be set in the laser driver 302 by a laser threshold register 324 and laser pulse register 326 in the laser driver 302. Threshold level 320 typically is selected as that current causing the laser diode to reside at the verge of extinction in order to enhance laser diode turnon/turnoff risetimes. A receiver 332 (corresponding to receiver 254 of FIGS. 2 and 4) may be used to receive the laser trigger pulse signal 312 transmitted across the flexible transmission line (e.g., 222).

In practice, continuously variable delay element 304 and variable delay element 306 may be implemented as cascades of starved invertors having programmable loads variable by a delay-setting digital-to-analog convertor receiving digital input from a preamplifier register, or as a local phase-locked frequency-multiplier loop in the preamplifier, etc. If a phase-lock implementation is employed having an edge-sensitive phase detector, then receiver 332 may receive as input the write data signals transmitted by block 220 of FIG. 2, enabling the laser trigger lines 312 to be omitted.

Figure 4:
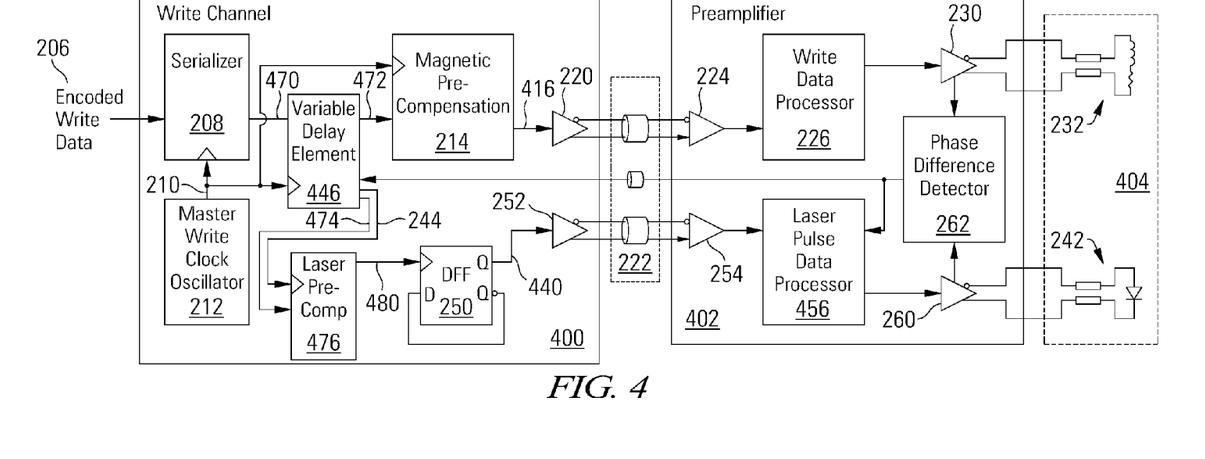
FIG. 4 depicts an implementation of a write channel, preamplifier and magnetic write head suitable for use in the magnetic storage system of FIG. 1 and incorporating magnetic write-precompensation and laser pulse precompensation in accordance with some embodiments of the present invention.

Turning to FIG. 4, some embodiments of a write channel 400, preamplifier 402 and write head assembly 404 support laser pulse precompensation, either with or without magnetic write-precompensation. In the instances employing both laser pulse precompensation and magnetic write-precompensation, such as that depicted in FIG. 4, the laser pulses and data bits with write precompensation are correlated, such that each laser pulse corresponds to a particular data bit. Again, the manner in which write precompensation is applied to laser pulses and data bits may be adapted to a number of various techniques. The relationship between each laser pulse and the corresponding data bit is maintained in the example embodiment of FIG. 3 by passing the serialized data bits 470 through the variable delay element 446 before they reach the magnetic precompensation circuit 214. The variable delay element 446 adjusts the relative phasing between the laser trigger pulses and the magnetic write data, yielding delayed serialized data bits 472. Such phasing may possess a span greater than the bit period of the magnetic write data signal. The magnetic precompensation circuit 214 thus yields delayed precompensated magnetic write data 416. The variable delay element 446 also yields delayed serialized data bits 474, which are processed in conjunction with shifted clock signal 244 in a laser pulse precompensation circuit 476 to generate precompensated shifted clock 480 destined for use in laser trigger pulse generation. The delayed serialized data bits 474 has the same phase delay applied by the variable delay element 446 as the shifted clock signal 244 in some embodiments. Flip flop 250 generates laser trigger pulse signal 440 based on precompensated shifted clock 480, with laser trigger pulse signal 440 being time-precompensated to compensate for nonlinear transition shift in the writing process. Laser pulse precompensation may be used in high-density systems employing pulsed laser illumination to imprint the bit in the medium rather than simply to reduce slider heating. The laser pulse precompensation circuit 476 applies precompensation to the precompensated shifted clock 480, and thereby to the laser trigger pulse signal 440 and to the laser pulse control signal generated by the laser pulse data processor 456.

The laser trigger pulse signal 440 and the magnetic write data 416 are transmitted to the preamplifier 402, which performs the functions disclosed above with respect to FIG. 2. For example, to assure that signals in the laser path are properly time-aligned to those in the magnetic path, the optional phase difference detector 262 in the preamplifier 402 measures the phase difference between the laser pulses and the data bits to guide the phase setting in the variable delay element 446.

Figure 5:
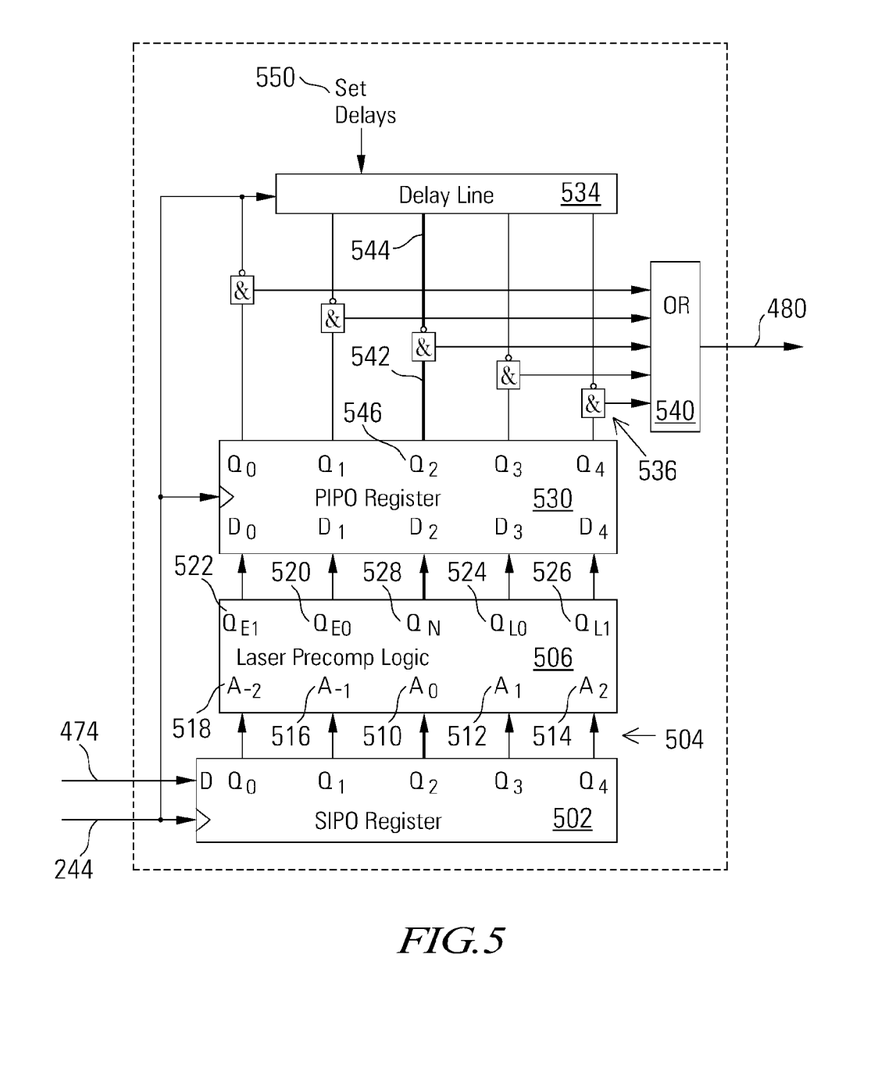
FIG. 5 depicts an implementation of a laser pulse precompensation circuit suitable for use in the write channel of FIG. 4 in accordance with some embodiments of the present invention.

Turning to FIG. 5, an implementation of a laser pulse precompensation circuit 500 suitable for use in the write channel of FIG. 4 is depicted in accordance with some embodiments of the present invention. The delayed serialized data bits 474 are a phase-shifted replica of serialized data bits 470 produced by variable delay element 446. The delayed serialized data bits 474 are received into Serial-In Parallel-Out (SIPO) shift register 502 which yields a parallel output 504. The parallel output 504 is provided to a laser precompensation combinational logic element 506 which computes the laser diode precompensation pattern. Input $A_0$ 510 is the reference bit or the bit being examined, designated in FIG. 5 by a bold line. Inputs A1 512, A2 514, A-1 516 and A-2 518 denote, respective, the input look-back and look-ahead pairs. The timing of the reference bit is varied according to the state of adjacent bits, as governed by laser precompensation logic block 506. The example embodiment depicted in FIG. 5 determines compensation on the basis of the state of the two bits adjacent each side of the reference bit A0 510. Fewer or more bits may be used. Outputs $Q_{E0}$ 520, $Q_{E1}$ 522 select incrementally earlier laser pulse time-shifts; outputs $Q_{L0}$ 524, $Q_{L1}$ 526 select incrementally later time-shifts relative to the nominal non-shifted timing $Q_N$ 528. The outputs $Q_{E0}$ 520, $Q_{E1}$ 522, $Q_{L0}$ 524, $Q_{L1}$ 526 and $Q_N$ 528 from laser precompensation combinational logic element 506 are pipelined in Parallel-In Parallel-Out (PIPO) register 530 which allows nearly an entire bit period for logic ripple-through. In other embodiments, other delays may be provided for logic ripple-through.

The parallel outputs 532 of PIPO register 530 identify the output tap of delay line 534 selected using AND gates 536 and OR gate 540. At each bit period, one output of PIPO register 530 is active, thereby assuring that a single laser pulse occurs in each bit cell. Reference position 542 (nominal timing) is tapped from the midpoint 544 of the delay line 534 under the influence of output $Q_2$ 546. The transit times of sections of delay line 534 are specified by the contents of programmable registers 550 in the Recording Channel. To assure delay stability across environmental and process variations, delay line 534 may be realized as, but is not limited to, a tandem connection of invertors matched to those employed in the voltage-controlled ring oscillator of master write clock oscillator 212.

Polarity inversions on the terminals of AND gates 536 driven by the delay line 534 indicate satisfaction of the gates by the negative portion of shifted clock signal 244 and allow time for the outputs of PIPO register 530 to settle before occurrence of the earliest precompensation edge (extension is possible by shrinking the low-going portion of the clock).

An example partial truth table of laser precompensation combinational logic element 506 is provided in Table 1, where $A_0$ is the reference input, and $Q_N$ is the nominal output; other rules may be adopted in practice.

TABLE 1

| Input | | | | | Output | | | | | Comment |
|---|---|---|---|---|---|---|---|---|---|---|
| <$A_{-2}$ | $A_{-1}$ | $A_0$ | $A_1$ | $A_2$> | <$Q_{E1}$ | $Q_{E0}$ | $Q_N$ | $Q_{L0}$ | $Q_{L1}$> | |
| 0 | 0 | 0 | 0 | 0 | 0 | 0 | 1 | 0 | 0 | Uniform 0s (no magnetic WD xsns): no shift |
| 1 | 1 | 1 | 1 | 1 | 0 | 0 | 1 | 0 | 0 | Uniform 1s (no magnetic WD xsns): no shift |
| 0 | 0 | 1 | 1 | 1 | 0 | 0 | 1 | 0 | 0 | Isolated magnetic WD xsn: no shift |
| 1 | 1 | 0 | 0 | 0 | 0 | 0 | 1 | 0 | 0 | Isolated magnetic WD xsn: no shift |
| 0 | 0 | 1 | 0 | 0 | 0 | 0 | 0 | 1 | 0 | Isolated 1T magnetic dibit leading edge; shift first edge late |
| 0 | 0 | 0 | 1 | 0 | 0 | 1 | 0 | 0 | 0 | Isolated 1T magnetic dibit leading edge; shift first edge early |

Figure 6:
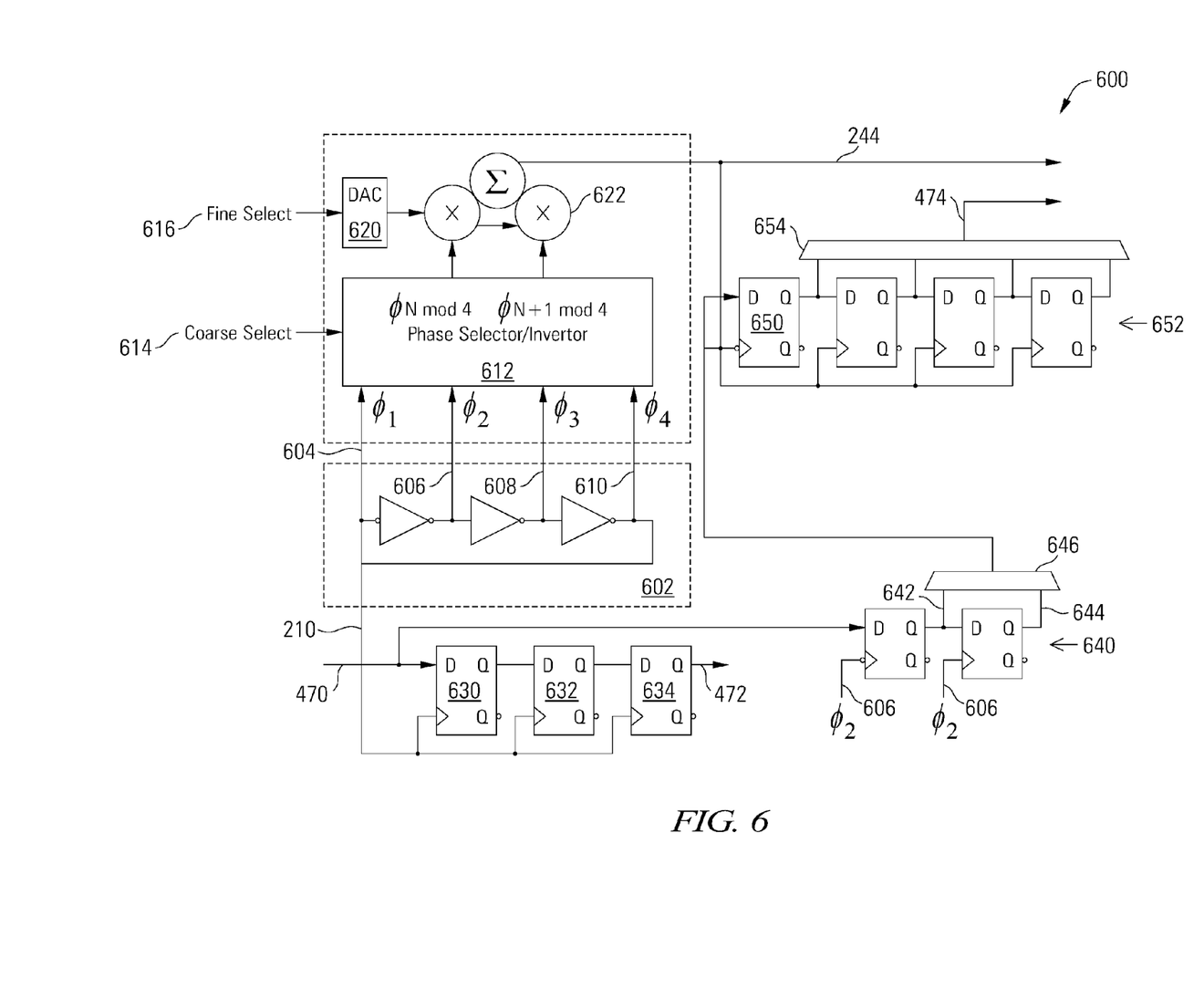
FIG. 6 depicts an implementation of a variable delay element suitable for use in the write channel of FIG. 4 in accordance with some embodiments of the present invention.

Turning to FIG. 6, an implementation of a variable delay element 600 suitable for use in place of the variable delay element 446 in the write channel of FIG. 4 is depicted in accordance with some embodiments of the present invention. Preamplifier magnetic write-driver and laser-driver path delays may typically each approach ~1 ns, of which it is likely that process- and environmentally-induced delay skew between paths can exceed 25%, a full bit-time at 4 Gb/s. Delay variations within the write channel (e.g., 400) and flexible transmission line (e.g., 222) further aggravate skew. To compensate for this delay skew in high-bit-rate systems employing laser pulse precompensation, some embodiments of the variable delay element 600 extend phase interpolation over multiple bit-times. The variable delay element 600 also provides interpolated shifted clock signal 244 and companion delayed serialized data bits 474 synchronized thereto, to the laser pulse precompensation circuit 476. The laser-pulse information may thus be programmably advanced or retarded relative to the magnetic data by subjecting data destined for the laser pulse precompensation circuit 476 to a delay variably shorter or longer than the bulk delay applied to delayed serialized data bits 472.

A four-stage ring oscillator 602 produces four output phases 604, 606, 608 and 610, and may be shared with the master write clock oscillator 212 as the frequency-generating element of a phase-locked loop (PLL) locked to a crystal source or to servo data read from the disc. For example, the clock signal 210 may be tapped from the four-stage ring oscillator 602 to clock the serializer 208 and magnetic precompensation circuit 214. A phase selector/inverter 612 programmably selects a pair of adjacent oscillator phases 604-610 and mixes the pair differentially, yielding shifted clock signal 244 which is a high-resolution phase-shifted clock for use in laser pulse precompensation circuit 476 or for direct use and frequency division as the laser pulse signal should laser-pulse precompensation not be used.

A coarse select input 614 to the phase selector/inverter 612 operates in concert with a fine select input 616 to digital to analog converter (DAC) 620 controlling the phase mixer 622 to permit a 360° phase shift at a typical resolution of 1/32nd cycle or better. With the four-stage ring oscillator 602 shown, each coarse select input 614 code corresponds to a 45° step, within which the fine select input 616 code furnishes a vernier. Phase interpolation is well-known and thus appears only in simplified form in FIG. 6. Those of ordinary skill in the art will recognize a number of circuits suitable for use in phase shifting the clock signal 210 to yield the shifted clock signal 244.

A series of D flip-flops 630, 632 and 634 apply a bulk delay to serialized data bits 470 to yield delayed serialized data bits 472 in order to support bidirectional phase-shifting of laser pulse data relative to magnetic data. The D input of the initial D flip-flop 630 D input is driven by the serialized data bits 470 from serializer 208.

The variable delay element 600 also generates delayed serialized data bits 474 used in the laser pulse precompensation circuit 500 to generate the precompensated shifted clock 480. A shift register 640 generates two time-skewed representations 642 and 644 of the incoming serialized data bits 470. Through selector switch 646, that channel is chosen which will yield sufficient setup and hold time for data capture in the initial D flip-flop 650 of shift register 652. The position of selector switch 646 is determined by a decoding of the coarse select input 614 to phase selector/inverter 612. Thus, serialized data bits 470 are unambiguously retimed to the shifted clock signal 244 produced by the phase selector/inverter 612. Shift register 652 and its associated output selector switch 654 support introduction of laser-versus-magnetic data phase shifts spanning multiple bit cells as disclosed above.

Figure 7:
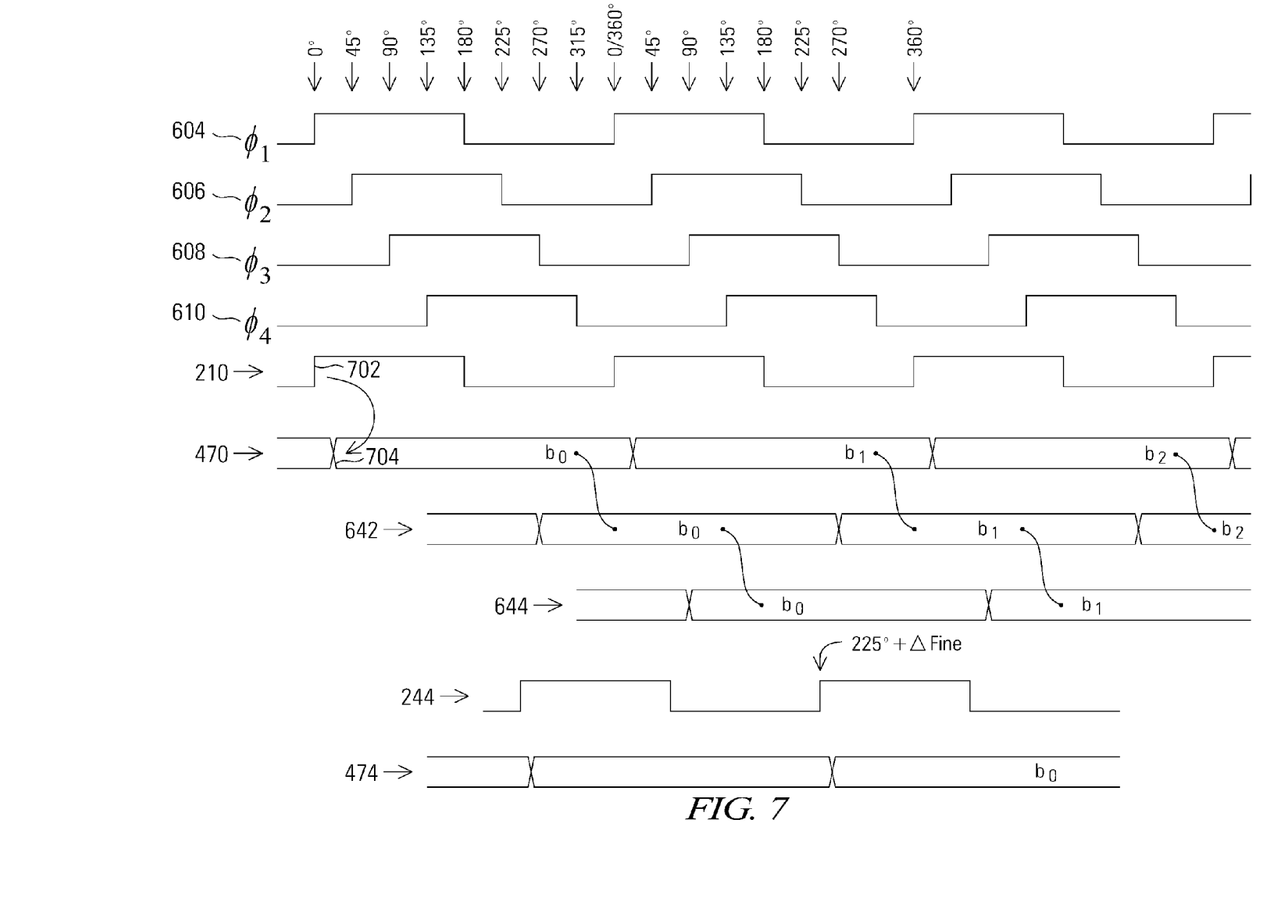
FIG. 7 depicts example waveforms at several locations in the variable delay element of FIG. 6 in accordance with some embodiments of the present invention.

Turning to FIG. 7, example waveforms illustrate the operation of the variable delay element 600 of FIG. 6 in accordance with some embodiments of the present invention. Waveforms are illustrated for output phases 604-610 of the four-stage ring oscillator 602. The relationship is illustrated between a rising clock edge 702 and a transition 704 in serialized data bits 470, as well as the delays applied in time-skewed representations 642 and 644 by shift register 640. The waveform is also illustrated for shifted clock signal 244, given an example setting of coarse select input 614=225°, fine select input 616=mid, and for delayed serialized data bits 474 with selector switch 654 set at the left-most position.

The above disclosure has, for brevity, dealt only with a single-clock-phase system. Those of ordinary skill in the art will recognize that the heat assisted magnetic recording system is also applicable to multi-phase clocking for very high data rates.

Figure 8:
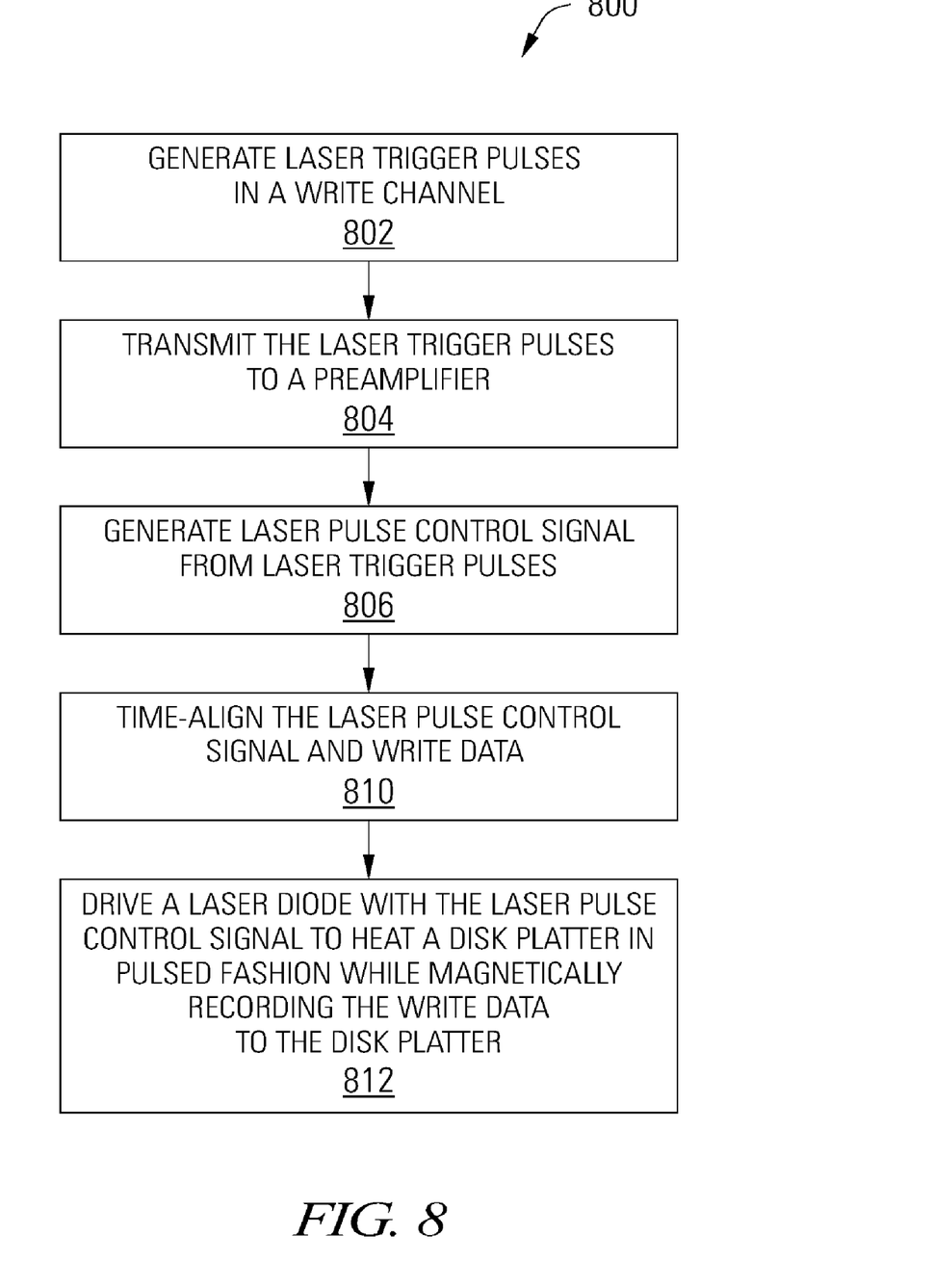
FIG. 8 depicts a flow diagram showing a method for heat assisted magnetic recording in accordance with some embodiments of the present invention.

Turning to FIG. 8, a flow diagram 800 depicts a method for heat assisted magnetic recording in accordance with some embodiments of the present invention. The method of FIG. 8, or variations thereof, may be performed in HAMR circuits such as those illustrated in FIGS. 1-7. Following flow diagram 800, laser trigger pulses are generated in a write channel (Block 802) In some embodiments, the laser trigger pulses are generated at the transition rate of the magnetic write data signal. The laser trigger pulses are transmitted to a preamplifier. (Block 804) A laser pulse control signal is generated based on the laser trigger pulses. (Block 806) The laser pulse control signal and magnetic write data are time-aligned. (Block 810) This is beneficial for example when precompensation is applied to advance or delay the magnetic write data, maintaining the correlation between laser pulses and data bits. A laser diode is driven with the laser pulse control signal to heat a disk platter in pulsed fashion while magnetically recording data bits to the disk platter. (Block 812)

Figure 9:
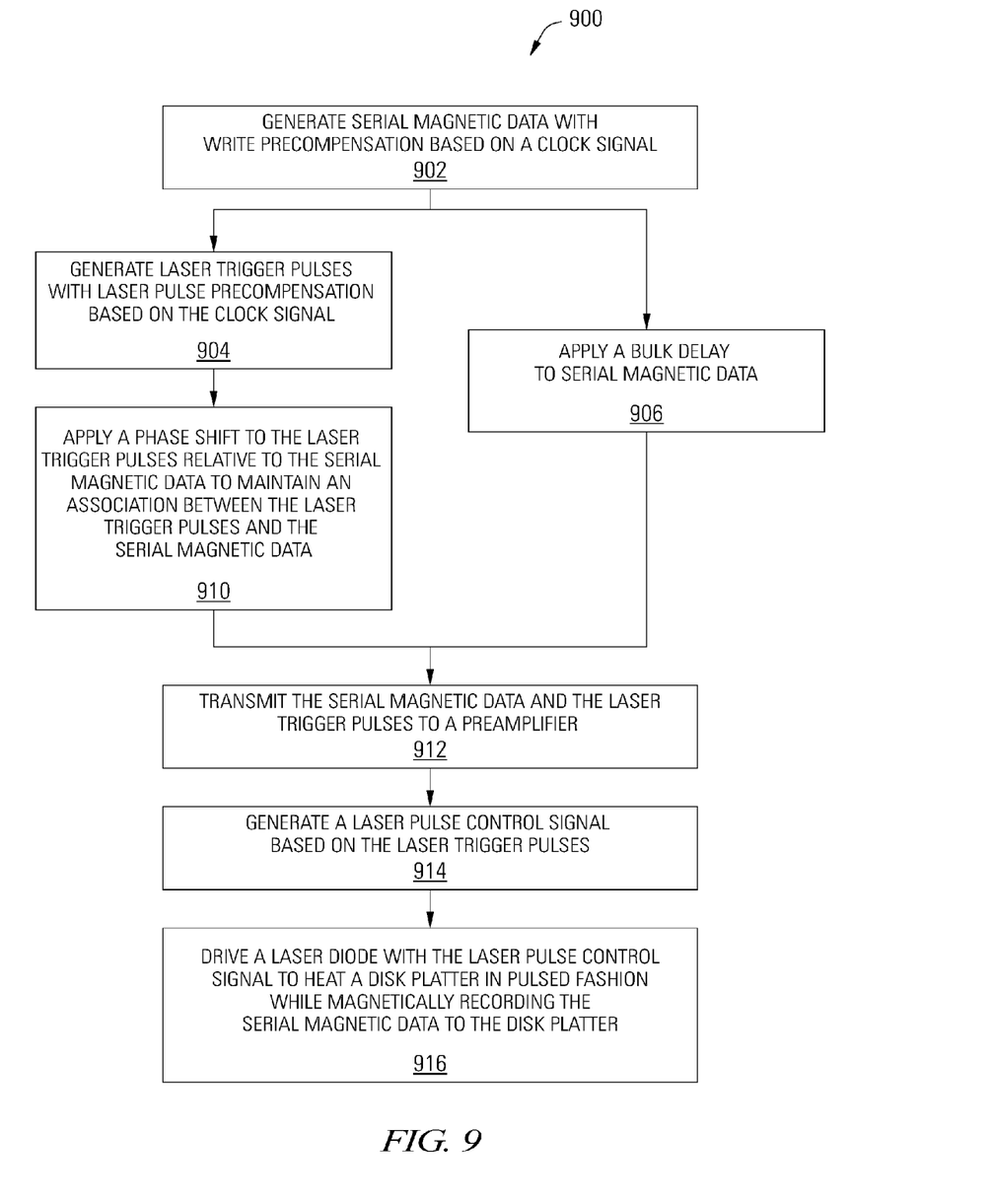
FIG. 9 depicts a flow diagram showing a method for heat assisted magnetic recording including laser pulse precompensation and magnetic write precompensation in accordance with some embodiments of the present invention.

Turning to FIG. 9, a flow diagram 900 depicts a method for heat assisted magnetic recording including laser pulse precompensation and magnetic write precompensation in accordance with some embodiments of the present invention. The method of FIG. 9, or variations thereof, may be performed in HAMR circuits such as those illustrated in FIGS. 1-7. Following flow diagram 900, serial magnetic data with write precompensation are generated based on a clock signal. (Block 902) Laser trigger pulses with laser pulse precompensation are generated based on the clock signal. (Block 904) In some embodiments, the laser trigger pulses are generated at the transition rate of the serial magnetic data. A bulk delay is applied to the serial magnetic data. (Block 906) A phase shift is applied to the laser trigger pulses relative to the serial magnetic data to maintain an association between the laser trigger pulses and the serial magnetic data. (Block 910) In some embodiments, the range across which the laser trigger pulses may be shifted exceeds a bit period. In some embodiments, the serial magnetic data is phase shifted relative to the laser trigger pulses. In yet other embodiments, both the laser trigger pulses and the serial magnetic data are phase shifted to maintain the desired relationship between the two. Notably, the laser trigger pulses and magnetic write data are processed in parallel. The serial magnetic data and the laser trigger pulses are transmitted to a preamplifier. (Block 912) In some embodiments, these are transmitted across a flexible conductor. A laser pulse control signal is generated based on the laser trigger pulses. (Block 914) In some embodiments, the pulse width of the laser pulse control signal is also adjusted. A laser diode is driven with the laser pulse control signal to heat a disk platter in pulsed fashion while magnetically recording the serial magnetic data to the disk platter. (Block 916) Notably, steps in the methods are not limited to the example order disclosed above.

In conclusion, the present invention provides novel apparatuses, systems, and methods for heat assisted magnetic recording. While detailed descriptions of one or more embodiments of the invention have been given above, various alternatives, modifications, and equivalents will be apparent to those skilled in the art without varying from the spirit of the invention. Therefore, the above description should not be taken as limiting the scope of the invention, which is defined by the appended claims.

What is claimed is:

1. An apparatus for heat assisted magnetic recording comprising:
   a signal generator operable to generate a laser trigger pulse signal using a same clock signal used to clock a magnetic write data signal;
   a variable delay element operable to control an alignment between the laser trigger pulse signal and the magnetic write data signal;
   a phase difference detector operable to control the variable delay element;
   a triggerable pulse generator circuit operable to generate a laser pulse control signal based on the laser trigger pulse signal;

a magnetic write head operable to record data to a magnetic storage medium under control of the magnetic write data signal; and a laser diode operable to heat the magnetic storage medium under control of the laser pulse control signal.

2. The apparatus of claim 1, wherein the signal generator is located in a write channel circuit and wherein the triggerable pulse generator circuit is located in a preamplifier.

3. The apparatus of claim 2, wherein the laser trigger pulse signal is transmitted between the write channel circuit and the preamplifier across a flexible transmission line.

4. The apparatus of claim 3, wherein the laser trigger pulse signal is multiplexed with the magnetic read data signal across the flexible transmission line.

5. The apparatus of claim 2, wherein the laser trigger pulse signal is generated at a transition rate of the magnetic write data signal.

6. The apparatus of claim 5, wherein the triggerable pulse generator circuit generates a pulse at each edge of the laser trigger pulse signal.

7. The apparatus of claim 5, wherein the triggerable pulse generator circuit is operable to programmatically adjust a pulse width of the laser pulse control signal.

8. The apparatus of claim 1, further comprising a laser precompensation circuit operable to apply a precompensation shift to the laser pulse control signal.

9. The apparatus of claim 8, wherein the variable delay element is operable to apply a delay to the magnetic write data signal.

10. The apparatus of claim 8, further comprising a magnetic precompensation circuit operable to apply a precompensation shift to the magnetic write data signal.

11. The apparatus of claim 8, wherein the variable delay element is operable to compensate for a phase difference between the laser pulse control signal and the magnetic write data signal.

12. The apparatus of claim 11, wherein the variable delay element is operable to compensate for a phase difference across a range that is greater than a bit period of the magnetic write data signal.

13. The apparatus of claim 1, further comprising a serializer operable to convert a parallel write data signal to yield the magnetic write data signal in serial form.

14. The apparatus of claim 1, wherein the apparatus is implemented as an integrated circuit.

15. The apparatus of claim 1, wherein the apparatus is incorporated in a storage device.

16. The apparatus of claim 1, wherein the apparatus is incorporated in a storage system comprising a redundant array of independent disks.

17. A method for heat assisted magnetic recording, comprising:

generating laser trigger pulses in a write channel;

transmitting the laser trigger pulses to a preamplifier;

generating a laser pulse control signal based on the laser trigger pulses in the preamplifier, wherein the laser pulse control signal comprises a pulse at each edge of the laser trigger pulses;

adjusting a time alignment of the laser pulse control signal with a magnetic write data signal; and controlling a laser diode with the laser pulse control signal to heat a magnetic storage medium while writing the magnetic write data signal to the magnetic storage medium.

18. The method of claim 17, further comprising:

calculating a laser pulse precompensation for the laser pulse control signal;

applying a delay to the magnetic write data signal; and calculating a magnetic write precompensation for the magnetic write data signal, wherein adjusting the time alignment is operable to maintain a correlation between a pulse in the laser pulse control signal and a corresponding data bit in the magnetic write data signal.

19. The method of claim 17, wherein the laser trigger pulses comprise the magnetic write data signal, and wherein the laser pulse control signal is generated using an edge sensitive phase detector.

20. A storage system comprising:

a storage medium maintaining a data set;

a write channel circuit;

a preamplifier circuit;

a magnetic write head operable to record data to a magnetic storage medium under control of a magnetic write data signal representative of the data set;

a laser diode operable to heat the magnetic storage medium under control of a laser pulse control signal;

wherein the write channel circuit comprises:

a signal generator operable to generate laser trigger pulses at a transition rate of the magnetic write data signal; and a variable delay element operable to control an alignment between the laser trigger pulses and the magnetic write data signal; and wherein the preamplifier circuit comprises:

a phase difference detector operable to control the variable delay element; and a triggerable pulse generator circuit operable to generate a laser pulse control signal based on the laser trigger pulses.

21. The storage system of claim 20, wherein the write channel circuit further comprises:

a magnetic precompensation circuit operable to apply a precompensation shift to the magnetic write data signal;

a laser pulse precompensation circuit operable to apply a precompensation shift to the laser pulse control signal; and wherein the variable delay element is operable to compensate for a phase difference between the laser pulse control signal and the magnetic write data signal across a range that is greater than a bit period of the magnetic write data signal.

22. The storage system of claim 20, wherein the laser pulse control signal comprises a pulse at each edge of the laser trigger pulses.

* * * * *